Oct. 9, 1962  F. J. HORNIK  3,056,971
SELF-RIMMING SINKS AND SECURING MEANS
Filed July 20, 1959  6 Sheets-Sheet 1
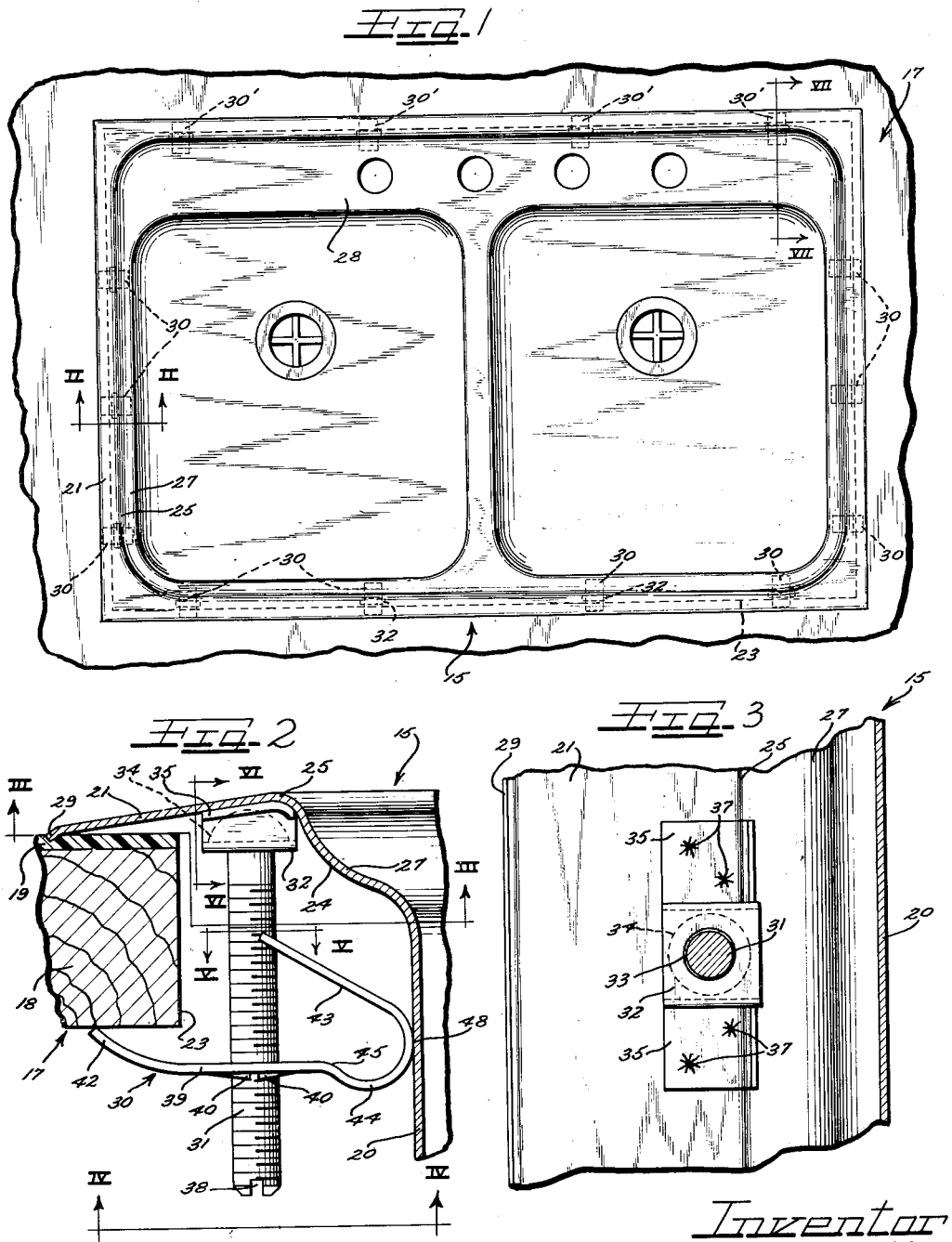
Inventor
FRANK J. HORNIK

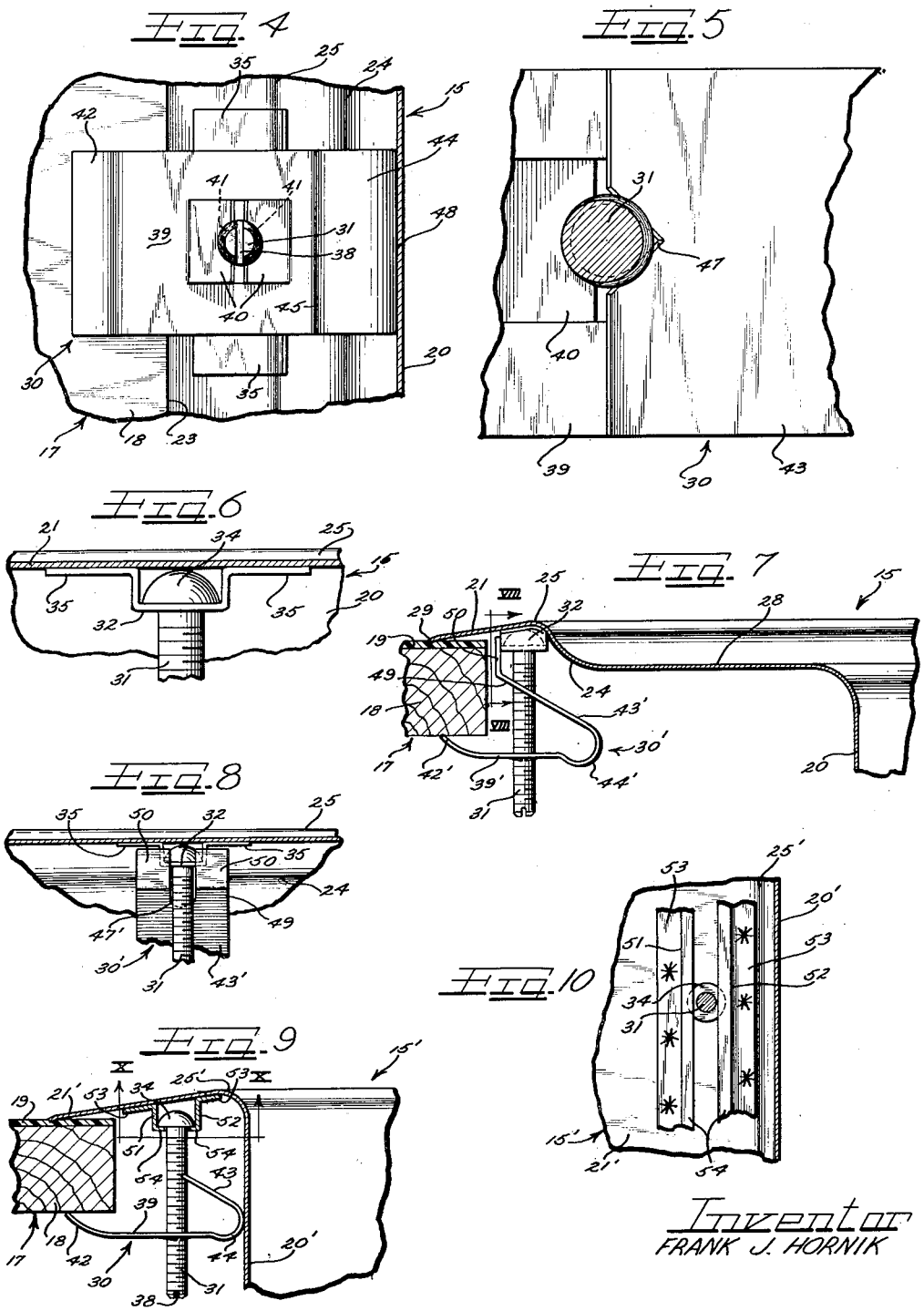

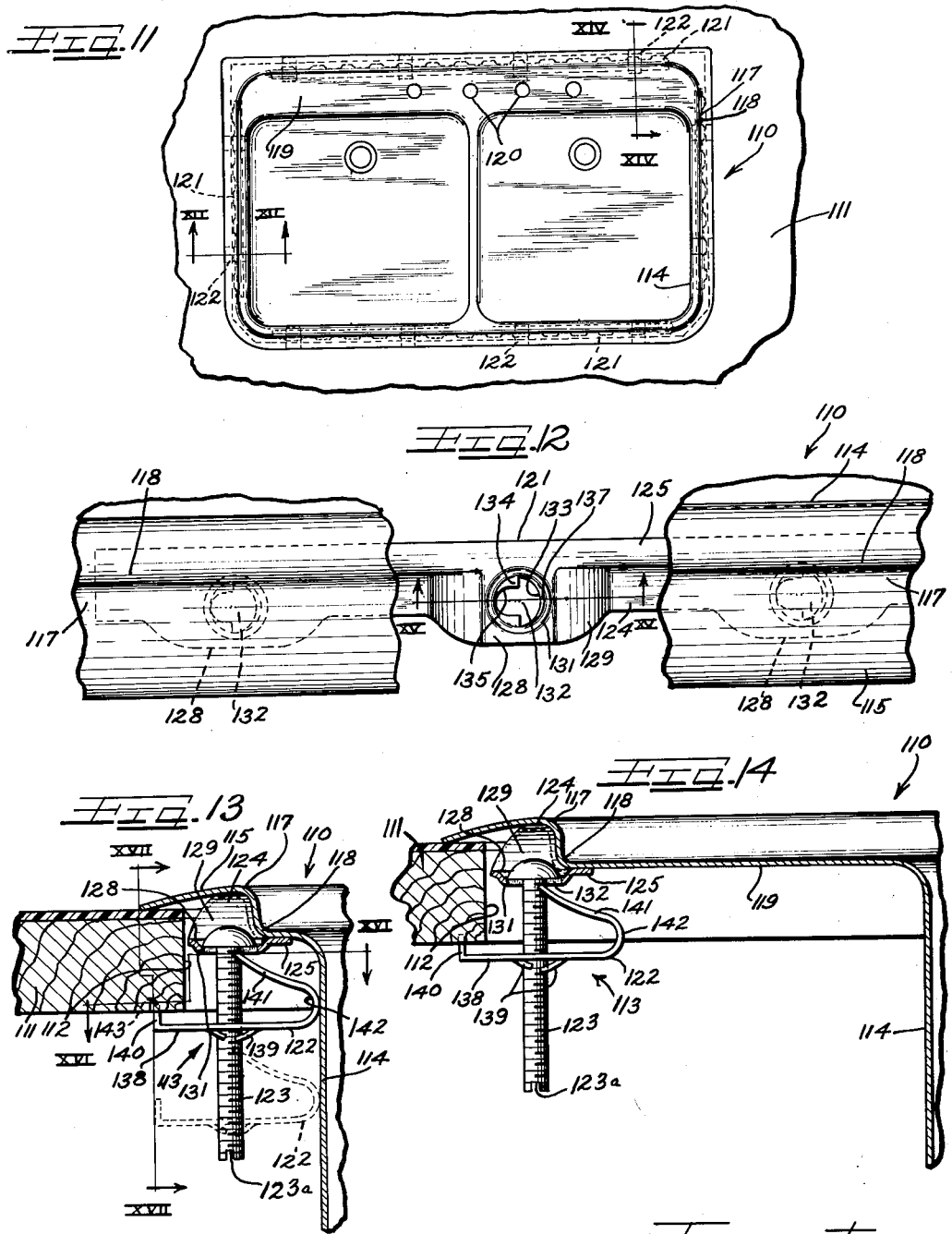

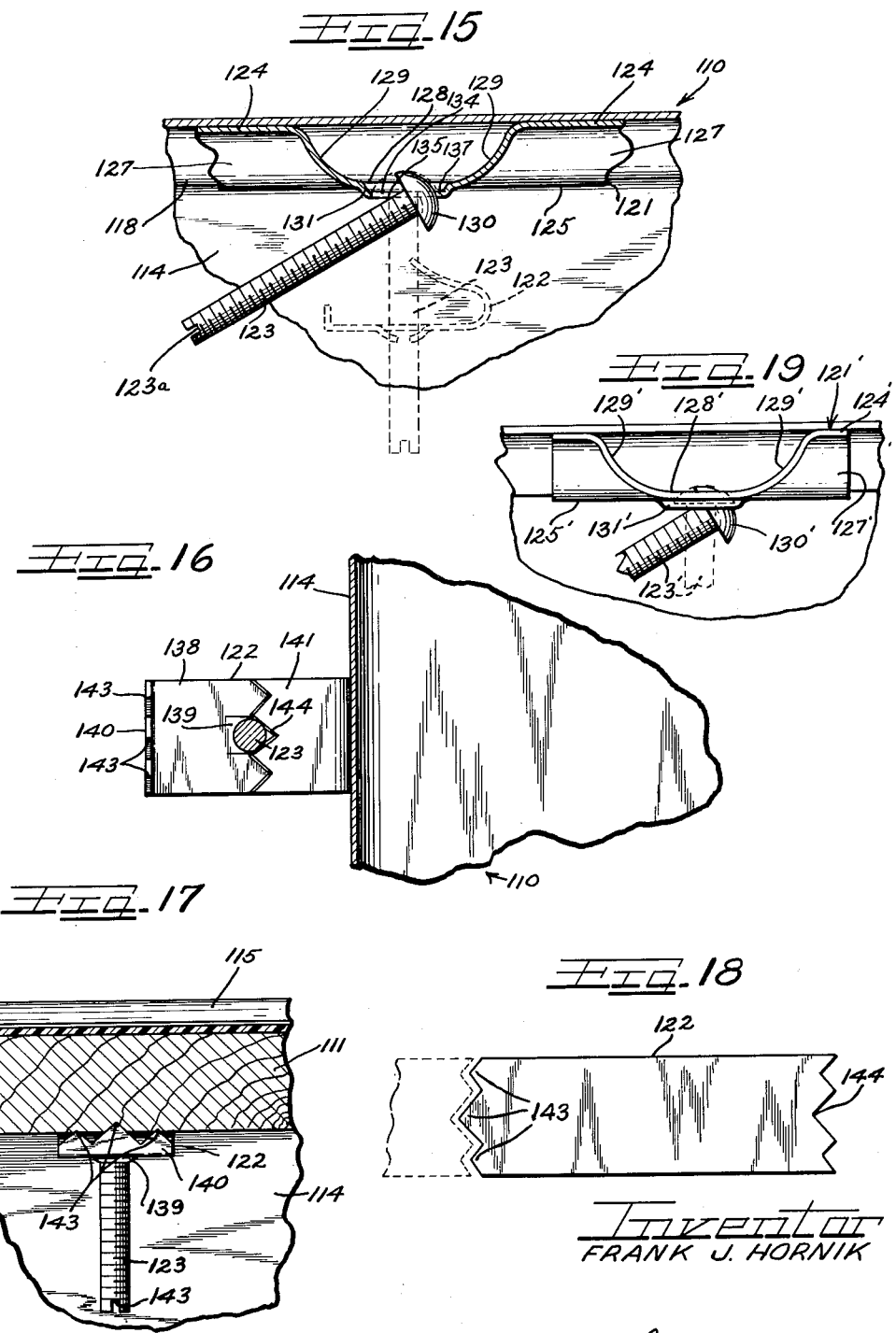

Oct. 9, 1962 F. J. HORNIK 3,056,971
SELF-RIMMING SINKS AND SECURING MEANS
Filed July 20, 1959 6 Sheets-Sheet 5
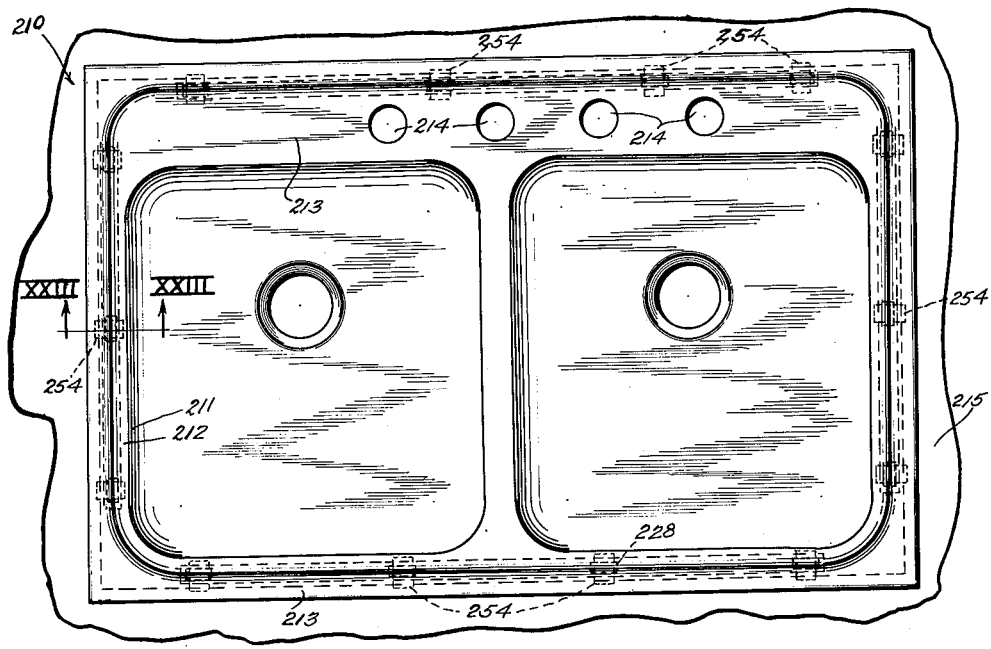
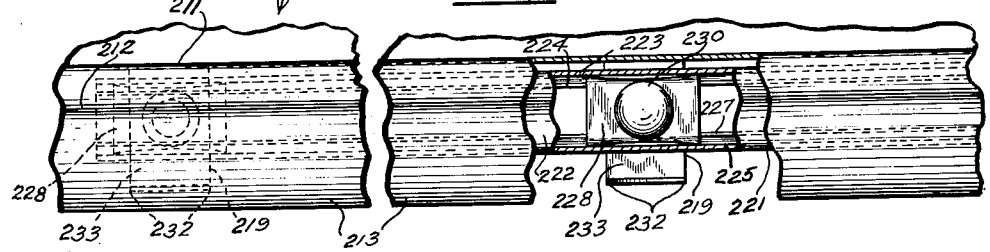
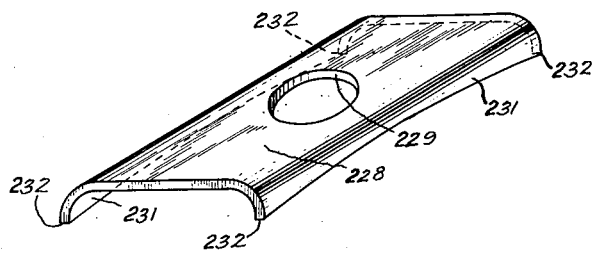
Inventor
Frank J. Hornik

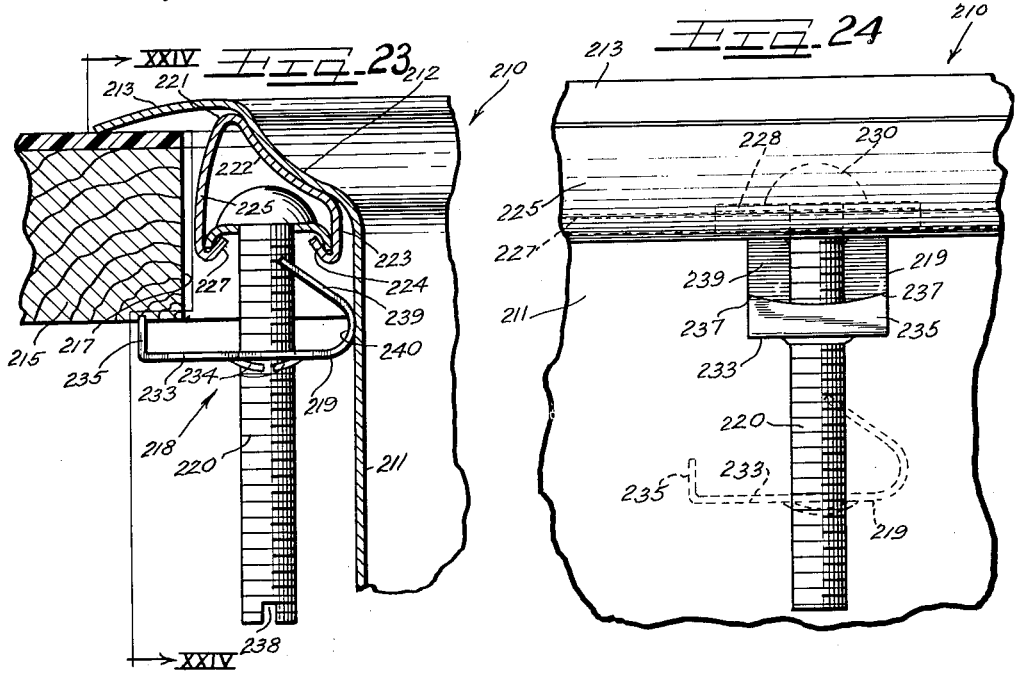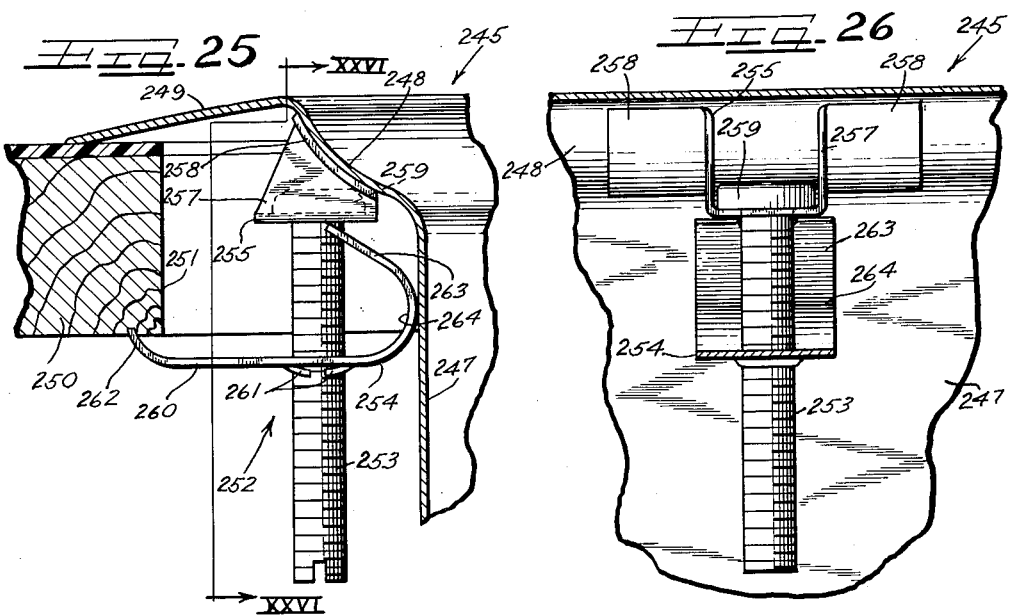

United States Patent Office 3,056,971
Patented Oct. 9, 1962

3,056,971
SELF-RIMMING SINKS AND SECURING MEANS
Frank J. Hornik, Southfield, Mich., assignor to Lyon Incorporated, Detroit, Mich., a corporation of Delaware
Filed July 20, 1959, Ser. No. 828,415
24 Claims. (Cl. 4—187)

This application is a consolidated continuation-in-part including all of the subject matter in my applications Serial Nos. 651,067 filed April 5, 1957, and 730,863 and 730,864 both filed April 25, 1958, all abandoned in favor of this application.

The present invention relates to improvements in sink structures, and more particularly concerns self-rimming sinks and means for securing the same in place in and on a counter top of the currently popular sink cabinet type of construction.

Self-rimming sinks are of the kind wherein the sink bowl has an upper marginal rim flange that overlaps the margin defining a sink-receiving opening in a supporting surface such as provided by a counter top, so that the rim flange itself provides support for the sink on the counter top without the need for a separate connecting or sealing strip or frame between the margin or rim flange of the sink and the margin of the sink counter top with which assembled.

There is, then, the problem of securing the sink bowl to the sink top in a manner to press the sink rim flange into substantially sealing engagement with the upper surface of the counter top and to retain the sink bowl against displacement. Some rather complex and expensive and in some instances rather awkward types of securing or attaching devices have been proposed. In some instances the securing means tend to warp relatively thin sheet metal sink bowls, such as stainless steel sinks.

Inasmuch as the rim flanges of drawn stainless steel sinks are fairly flexible which in one sense is highly desirable for enabling snug drawing of the sink rim against the deck or counter top surface, in another sense a problem is presented in that retaining means attached directly to the underside of the rim flange tends to produce localized warpage, especially if the retaining means are overtightened.

An important object of the present invention is to provide an improved self-rimming sink structure providing an especially efficient rimming flange construction and sink retaining means.

Another object of the invention is to provide improved means for securing self-rimming sinks in place.

A further object of the invention is to provide improved means for drawing and securing in place a self-rimming sink flange onto a counter top with substantial compressive force but nevertheless freedom from distortion or warpage of the sink bowl or rim flange.

Still another object of the invention is to provide improved means for securing self-rimming sinks in place in a simple and effective manner and enabling installation with the aid of a single simple tool such as a screwdriver.

A still further object of the invention is to provide improved retaining clip means for securing sink bowls in place.

Yet another object of the invention is to provide improved attachment means for sinks including novel bracket structure and distortion-free connection thereof to the sink.

An additional object of the present invention is to provide improved retaining means for self-rimming sinks which function as a reinforcement for the sink rim flange structure in a manner to avoid draw-up warpage but enabling free and ready resilient tensioning of the rim flange against the top of the counter within which the sink is supported.

It is also an object of the invention to provide improved self-rimming sink retaining structure which is advantageously adjustable with respect to the sink rim flange with which associated.

Other objects, features and advantages of the present invention will be readily apparent from the following detailed description of certain preferred embodiments thereof taken in conjunction with the accompanying drawings in which:

FIGURE 1 is a top plan view of a sink and counter top assembly;

FIGURE 2 is an enlarged fragmentary vertical sectional detail view taken substantially on the line II—II of FIGURE 1 and showing one of the retaining clip structures by which the sink is secured in place;

FIGURE 3 is a fragmentary sectional elevational detail view taken substantially on the line III—III of FIGURE 2;

FIGURE 4 is a fragmentary bottom plan view taken substantially in the plane of line IV—IV of FIGURE 2;

FIGURE 5 is a fragmentary enlarged sectional elevational detail view taken substantially on the line V—V of FIGURE 2;

FIGURE 6 is a fragmentary sectional elevational detail view taken substantially on the line VI—VI of FIGURE 2;

FIGURE 7 is an enlarged fragmentary sectional elevational detail view taken substantially on the line VII—VII of FIG. 1 and showing the manner in which the back or shelf portion of the sink is attached;

FIGURE 8 is a fragmentary sectional elevational detail view taken substantially on the line VIII—VIII of FIGURE 7;

FIGURE 9 is a fragmentary vertical sectional elevational detail view similar to FIGURE 2 but showing a modification;

FIGURE 10 is a fragmentary sectional elevational detail view taken substantially on the line X—X of FIGURE 9;

FIGURE 11 is a top plan view of a sink installation embodying features of a modification of the invention;

FIGURE 12 is a fragmentary enlarged top plan view of one portion of the sink rim of FIG. 11 with a portion thereof broken away to show details of the screw-retaining bracket;

FIGURE 13 is an enlarged fragmentary sectional detail view taken substantially on the line XIII—XIII of FIGURE 11;

FIGURE 14 is an enlarged fragmentary sectional detail view taken substantially on the line XIV—XIV of FIGURE 11;

FIGURE 15 is a fragmentary sectional detail view taken substantially on the line XV—XV of FIGURE 12 and demonstrating how an attachment screw is assembled with the retaining bracket;

FIGURE 16 is a fragmentary sectional view taken substantially on the line XVI—XVI of FIGURE 13;

FIGURE 17 is a fragmentary sectional elevational view taken substantially on the line XVII—XVII of FIGURE 13;

FIGURE 18 is a developed plan view of a blank from which one of the retaining clips of FIGS. 11–17 is formed;

FIGURE 19 is an edge elevational view of a single unit retaining bracket;

FIGURE 20 is a top plan view of a sink structure embodying features of still another modification of the invention;

FIGURE 21 is a fragmental top plan view of a portion of one rim flange section of the sink of FIGURE 20 on an enlarged scale and with certain parts broken away and in section to reveal details of structure;

FIGURE 22 is an isometric view of one of the screw retainer or saddle members of the clip supporting or retaining bracket structure of FIGS. 20 and 21;

FIGURE 23 is an enlarged fragmentary sectional detail view taken substantially on the line XXIII—XXIII of FIGURE 20;

FIGURE 24 is a fragmentary elevational detail view taken substantially in the plane of line XXIV—XXIV of FIGURE 23;

FIGURE 25 is a vertical sectional detail view similar to FIGURE 23 but showing a further modification; and FIGURE 26 is a sectional elevational detail view taken substantially on the line XXVI—XXVI of FIGURE 25.

Having reference to FIGURE 1, a sink assembly is shown including a sink bowl structure 15 in the present instance of the double bowl variety although it may comprise a single bowl if preferred, supported in and by a cabinet type counter top 17, also sometimes referred to as a deck or drainboard. By preference, the sink bowl structure 15 is made as a stamping from suitable gauge stainless steel plate or sheet, or any other suitable sheet metal. The sink counter top 17 may comprise a conventional structure including a wooden core or base member 18 carrying bonded to the top thereof a thermosetting surfacing layer or lamination or veneer 19 (FIG. 2).

The bowl or bowls of the sink 15 include vertical wall portions 20 joining at least at the opposite sides of the sink, and in the present instance also at the front and at the back of the sink a self-rimming integral laterally projecting, overhanging marginal rim flange 21 which is adapted when the sink bowl or bowls are received within a suitable opening 23 in the sink table or counter top 17 to overlie the margin of the top about the opening for thereby supporting the sink in place. The opening 23 may be cut in the counter top 17 with the aid of a sized template whereby to dimension the hole to receive the sink bowl with adequate clearance to receive sink retaining means to be described.

Juncture of the vertical wall structure 20 with the flange 21 is effected on a reinforcing rib structure which, in the form of FIGURES 1 and 2, comprises an indented inner rib 24 and an upwardly projecting outer rib 25. The construction and arrangement is such that the indented reinforcing rib 24 provides at the sides and front of the sink a shallow generally inwardly sloping run-back groove 27 which at the back of the sink is widened to provide a plumbing access and utility shelf 28. At its outer side, the upstanding reinforcing rib 25 merges with the rim flange 21 which slopes obliquely at a shallow angle from the ridge of the rib 25 toward convergence with the top lamination 19 and preferably has a slightly downturned edge extremity 29 engaging bitingly and in substantially fluid sealing relation within the upper surface of the latter.

Between the edge of the table top defining the aperture or opening 23 and the adjacent vertical wall portions 20 and more particularly the indented reinforcing rib 24 of the sink, substantially centered within the aperture 23, is provided a substantial gap or space within which securing means are accommodated. According to the present invention, such securing means comprise resilient, spring retaining clips 30, herein of generally J-shape, assembled with respective retaining screws 31 carried underneath the rim flange 21 by suitable brackets 32. There may be as many of the retaining clips 30 as desirable to effect a secure, uniform attachment of the sink and compression of the rim flange 21 toward and against the table or sink counter top 17 and also centered retention of the sink against transverse displacement.

Each of the brackets 32 preferably comprises a generally U-shaped body portion provided centrally with an aperture 33 for free turning suspension therethrough of the shank of the associated screw 31, with a head 34 of the screw supported in free turning relation on the upper side of the web of the bracket body inside the U. From each of the up-standing legs of the bracket body extends in respectively opposite direction an attachment flange 35 which in each instance is preferably shaped to conform with and to the contour of the underside of the sink rim reinforcing rib 25 and the adjacent portion of the flange 21 of the sink and with the screw supporting web of the bracket substantially horizontal, as shown in FIGURES 2 and 3. Attachment of the flanges 35 is preferably effected by means of spot welding 37. Through this arrangement, the screw 31 is supported in each instance in depending or suspended relation within the gap between the edge of the table or sink top 17 defining the opening 23 and the opposing portions of the sink 15 for access from below the rim flange 21.

In relation to the thickness of the sink counter top 17, the shank of the screw 31 should be of a length to extend a reasonable distance therebelow both for ease of assembly therewith of the associated retaining spring clip 30 and for ready access to a manipulating tool, as well as to afford adequate run-up shank length for the clip. At its lower end, which is preferably blunt, the screw 31 is provided with suitable tool engagement means such as a screwdriver slot 38 although in addition thereto or alternatively wrench flats may be provided if desired. Suitably pitched threads running up from the tip or lower end of the screw shank to adjacent the head 34 of the screw are provided.

For engagement with the underside of the counter top board 17, the retaining clip 30 in each instance is provided with a clamping or gripping leg or third part 39 adapted to be disposed in the assembly substantially horizontally with the shank of the screw 31 threaded through a self-contained, struck out, lock-nut structure comprising an opposed pair of obliquely downwardly converging centrally located struck out nut flanges or tabs 40 (FIGS. 2 and 4). These have in their adjacent tips respective complementary cut-outs or recessed notches 41 dimensioned for engagement with the screw shank within the thread thereof so that by threading the screw through the screw hole thus provided by the notches 41 and between the tips of the integral nut flanges 40 of the clip leg 39 disposed in gap relation, the clip 30 can be run up the screw shank until a turned up end portion or tip extremity or second part 42 on the clip leg 39 engages against the underside of the margin of the counter top 17. In the continued turning of the screw 31 as by means of a screwdriver applied in the driver slot 38, the clip leg 39 is clampingly tensioned resiliently against the underside of the counter top 17 and the rim flange 21 of the sink is drawn down clampingly against the top of the counter top. Although this creates a substantial pull downwardly upon the sink member 15, distortion of the sink rim is avoided due to the rigidity imparted by the reversely bent, substantially ogee reinforcing ribs 24 and 25, and especially the reinforcing rib 25 within the underside or bight of which the screw supporting or anchoring brackets 32 are fixedly permanently secured.

In order to avoid canted distortion of the retaining clip leg 39, that is, tendency for the clamping leg of the clip to tilt about a horizontal axis transversely through the nut portion thereof so that the inner end of the leg would tend to move upwardly ahead of the outer or counter top engaging terminal end portion 42 thereof as the clip is run up the screw, stabilizing means are provided for the clip 30. Herein, such stabilizing means are provided in a simple and efficient manner by equipping the clip 30 with an integral generally return-bent stabilizing leg 43 (FIGS. 2 and 5). A substantially reinforced rigidifying, bracing one-piece integral juncture of the stabilizing leg 43 with the inner end portion of the clamping leg 39 of the clip is effected by the provision of a connecting bight portion 44 of substantial radius and including at juncture with the leg 39 an additional short radius reinforcing rib bend 45. From the reinforcing juncture 44, the stabilizing leg 43 extends generally divergently obliquely upwardly in overlying relation to the inner end portion of the leg 39 and is of a length to engage in a central notch 47 opening from the distal extremity or trip thereof about an adjacent portion of the screw shank within the thread thereof and in substantially coaxial alignment with the innermost of the nut flanges or tabs 40. As a result, the notched tip of the stabilizing leg 43 runs up the shank of the screw 31 coincident with running up of the leg 39 of the clip by means of the nut tabs 40. Thereby, any tendency of the clip leg 39 to cant incident to clamping engagement of the tip 42 thereof with the deck member 17 is thoroughly counteracted by the substantially triangular strut-like stabilizing clip leg 43 thrusting endwise against the screw shank and prevented from slipping longitudinally along the shank by the screw thread within which the edges defining the notch 47 are engaged. Any tendency toward distortion or twisting or bending of the inner end portion of the clip leg 39 is thoroughly resisted by the reinforcing generally reversely directed juncture ribs 44 and 45 of the clip. Hence, the nut tabs 40 will uniformly engage the shank of the screw 31 and guide the clip into its clamping relation as the screw is turned to run up the clip, and as the draw-up pressure or tension increases the nut tabs 40 will gradually effect substantially uniform tightening and ultimately locking gripping engagement with the shank of the screw when the desired degree of draw-up has been effected and thereby efficiently hold the assembly against loosening due to vibrational disturbances in the associated structures.

Inasmuch as during the clamping, tensioning draw up turning of the screw 31 there is a natural tendency of the clip 30 to turn with the screw due to the gradually increasing grip of the screw tabs 40 on the screw shank, means are provided to hold the clip 30 against turning. Herein such means comprise effecting turn-preventing sliding interengagement of the connecting bight juncture rib 44 of the clip at an inwardly directed shoulder 48 thereof against the opposing outer surface of the vertical wall 20 of the sink bowl as best seen in FIGS. 2 and 4. Thus, as the clip 30 is run up the screw, the shoulder 48 slides up the outer wall surface of the sink bowl 20 and since the clip is of substantial width prevents the clip from turning relative to the axis of the screw 31. It is practical, of course, to have such turn-preventing shouldering of the clip against the opposing sink bowl wall at the opposite sides of the sink 15 and with most installations also at the front of the sink as will be appreciated from FIGURE 1.

However, at the back of the sink where the shelf 28 provides too great a spacing between the sink rim under which the retaining clips are mounted and the vertical sink bowl wall 20, to make it practical to extend the inner portion of the clip against the thus widely spaced sink bowl wall, a modified form 30' of the clip may be utilized as shown in FIGURES 7 and 8 wherein the retaining clip may be in most respects identical with the retaining clip 30, as indicated by similar primed reference numerals, but different turn-preventing means are provided. To this end, the stabilizing leg 43' is provided with distal or free end extensions 49 at each side of the screw-engaging notch 47' to extend forwardly alongside and beyond the shank of the screw 31 and free therefrom, that is, spaced sufficiently apart to avoid engaging the screw threads, to a position underneath the outer edge of the associated screw supporting bracket 32. Each of the extensions 49 has an upwardly angled stop lug terminal 50 which is arranged to engage in freely vertically slidable relation with the outer edge of the U-portion of the bracket 32. Thereby, any tendency toward turning of the clip 30' incident to draw-up on the screw 31 is counteracted.

Where preferred, or under circumstances where the use of the fixedly located individual brackets 32 is undesirable or inconvenient by reason of need for greater latitude in placement of the retaining clips along the sink rim, a retaining bracket arrangement as shown in FIGURES 9 and 10 may be used. In this instance, a sink 15' having a construction otherwise similar to the sink 15 of FIGURE 1 may be provided with merely the reinforcing upstanding juncture rib 25' between the vertical sink bowl wall 21 and the sloping sink rim flange 21', but retaining clips 30 may be utilized as shown or the clips 30' of FIGURE 7 may be utilized and arranged to be drawn up by the same type of screw 31. Instead of individual brackets for the screws 31, bracket means in the form of complementary elongated, cooperating generally Z cross-section rails 50 and 51 is provided. Each of the rails 51 and 52 has the main body portion thereof providing a vertical web having along the upper margin thereof a lateral attachment flange 53 which is secured as by welding to the underside of the rim flange 21. Along its lower margin each of the bracket rails is provided with a supporting flange 54 which is turned toward the opposite such supporting flange and is disposed in a common plane therewith to afford slidable support for the screw head 34, with the edges of the supporting flanges 54 spaced apart so as to afford clearance for free turning of the shank of the screw 31.

Since at least the innermost rail 52 is secured in the bight of the rib 25' any tendency toward clamping tension distortion of the sink rim is substantially precluded. Furthermore, since the rail members 51 and 52 are of substantial length and transverse rigidity due to their angular cross-section, they afford substantial reinforcement against such distortion of the rim flange of the sink. Through this arrangement it will be clear that the retaining clip 30 in each instance may be adjustably located selectively throughout the length of the bracket rails 51 and 52 which may, of course, be provided in any preferred length or sections to run the full length or any predetermined section of the length of the rim flange 21 along any side of the sink.

In the modification of FIGURES 11 through 14, a sink 110 is supported by a deck or counter top 111 having a hole 112 therein to receive the sink bowl with adequate clearance to accommodate sink-retaining means 113 in a gap between the edge defining the hole 112 and an upright wall 114 defining the sink bowl. Overlying the upper surface of the counter top 111 about the hole 112 is a rim flange 115 of the sink and possessed of sufficient resilient flexibility for tensioned seating as enhanced by the transverse slightly arched cross-section and downturned edge form of the flange as shown.

Substantial freedom from warpage in the rim flange 115 is assured by provision of an upwardly projecting radius ridge rib 117 at juncture of the flange with the sink bowl affording substantial reinforcement. Such reinforcement is enhanced by the provision of a generally reverse bent rib 118 affording a generally indented drain back groove between the upstanding rib 117 and the downwardly projecting sink bowl wall 114. At the rear of the sink the drain back groove is widened out to provide a ledge 119 adapted to accommodate faucet and spray holes 120.

According to the present invention, the sink retaining means 113 are constructed and arranged to draw the edge of the rim flange 115 into firm resiliently tensioned water tight engagement with the upper surface of the counter top 111 and also to hold the sink against transverse displacement within the sink aperture 112. To this end, the retaining means comprise three principal components, namely, bracket structure 121 attached to the underside of the rim flange structure, a series of retaining clips 122, and for each of the retaining clips a connecting screw 123 by which the clip is connected to the sink through the bracket structure 121.

In this instance, the bracket structure 121 comprises rail strips of generally Z-bar form and of suitable length to extend longitudinally along the front, rear and sides of the sink 110. Attachment of the respective bracket rails 121 may be effected by spot welding, brazing or the like. Welding warpage or clip draw up warpage are substantially precluded in the sink flange structure by attachment of the bracket rails to and closely adjacent to the reinforcing ribs 117 and 118, an upper flange 124 of the bracket rail in each instance being secured within the underside of the upstanding rib 117 and a lower bracket rail flange 125 being secured under the inwardly projecting rib 118 while an intermediate body flange portion 127 may, if desired, be attached to the common leg or side portion of the ribs. As a result, not only is the bracket rail secured to the most rigid portion of the rim flange structure, but since the rail in and of itself is possessed of some rigidity due to its angular cross-section, it affords additional reinforcement for the sink flange structure.

In order to enable assembly of the clips 122 and the screws 123 either just prior to assembling the sink 110 with the counter top 111, or after assembly of the sink with the counter top, as preferred, and also to enable location of the clips at selected intervals longitudinally of the particular side of the sink being secured in place, each of the bracket rails 121 is provided at a plurality of longitudinally spaced intervals with respective debossed areas 128 which may be substantially flush with or in a plane with the lower flange 125 and with generally flaring side wall portions 129 joining the upper flange 124 and the intermediate body flange portion 127. This affords a sturdy rigid structure and the debossed areas 128 afford convenient hanger recesses for the respective screws 123.

In order to facilitate assembly and rotary support of the respective screws 123 in the hanger recesses 128, each of the screws is provided with a convex crowned head 130 of predetermined diameter and affording a downwardly facing shoulder that projects laterally from the threaded shank of the screw. This screw head 130 is received in a reinforcingly depressed pocket recess 131 in the base of the hanger recess 128, with the screw shank depending through an aperture 132 in the pocket 131.

To facilitate assembly of the screw 123 from beneath the hanger recess 128, the aperture 132 is formed at one side with a chordally segmental enlargement 133 (FIG. 12) of slightly larger complementary shape with respect to the median cross-sectional shape and dimension of the screw head 130 so that as best seen in FIG. 15, the screw 123 can be assembled by a pendulum rocking movement wherein the screw head 130 is inserted upwardly into the recess portion 133 by an edgewise assembly movement and then slidably rocked over and onto respective supporting ledge portions 134 alongside a screw shank clearing elongated portion 135 of the screw aperture extending medially from the chord of the aperture portion 133. After the screw has been rocked into position wherein it hangs down as shown in dash outline in FIG. 15, the margin of the engagement shoulder of the screw head 130 finds a centered position within the screw head pocket 131 and in addition to the supporting ledge portions 134 also engages upon a narrow arcuate shelf or ledge portion 137 along the arcuate side of the aperture portion 133. This results in firm pull-out-free support of the screw head 130 within the pocket 131. Removal of the screw 123 can be readily effected by a reverse pendulum, canting swinging movement thereof so as to drop the screw head 130 down through the aperture portion 133. It will be observed that the aperture portions 133 and 135 are oriented to enable the assembly or disassembly pendulum swinging movement of the screw 123 in a plane longitudinally relative to the bracket rail 121 and thus also longitudinally within the limited gap between the edge defining the counter top aperture 112 and the sink bowl side wall 114.

Either before or after the screw 123 is assembled with the supporting bracket 121, the associated clip 122 is assembled with the screw. Each of the clips 122 includes a generally horizontal deck gripping leg 138 of substantially greater width than the screw shank and provided intermediate its length with severed yieldable self-adjustable nut flange means 139 providing an aperture through the leg 138 through which the screw shank projects and with the nut flange means engaging the threads of the screw shank. On one end portion the clip leg 138 is provided with substantially rigid upturned angular terminal flange means 140 engageable with the underside of the counter top 111. On its other end the clip leg 138 is connected integrally to a generally return-bent upwardly oblique stabilizer leg 141 joined to the gripping leg by a juncture bend shoulder 142. At its upper end the stabilizer leg 141 is engageable thrustingly with the shank of the screw. From an initial deck clearing assembled relationship on the lower end portion of the screw shank as shown in dash outline in FIGURES 13 and 15, the retaining clip 122 is adapted to be run up the screw by turning of the screw while the clip is held in non-rotary position. Turning of the screw is facilitated by provision of a tool grip structure on the lower terminus of the screw shank, such as a screwdriver slot 123a. Where the clip 122 is preassembled with the screw 123, the clip is turned to have the retaining leg 138 extend longitudinally relative to the adjacent edge of the sink so as to clear the edge defining the counter top aperture 112, the clip then being turned into counter top engaging position as shown from the position indicated in dash outline in FIGURE 15 to the dash outline position in FIGURE 13 before running the clip up the screw.

At the sides and front of the sink 110, the juncture shoulder 142 of the clip 122 is adapted to bear against the adjacent outerside of the sink bowl wall 114 and thus hold the clip against turning while it is being run up the screw. At the back of the sink where the clip is substantially spaced from the bowl wall 114 as shown in FIG. 14, the clip can easily be held against turning while it is run up into the retaining engagement with the counter top.

In order to avoid slipping or turning of the retaining leg 138 and more particularly the counter top engaging terminal flange 140 from the underside of the counter top, especially where for some reason rather limited grip area is afforded for the terminal flange 140, or where the clip cannot be held against turning by engagement of the shoulder 142 with the sink bowl wall, as for example under the ledge 119, biting prongs 143 (FIGS. 16 and 17) are preferably provided on the counter top engaging distal extremity of the terminal flange 140. In a preferred form, three of the prongs 143 are provided and the center prong is somewhat longer and wider at its base than the two side prongs, thereby affording initial biting grip on the center line of the clip leg 138 followed by biting penetrating grip of the side prongs after the larger longer center prong has been driven into the underside of the counter top. This assures that at least the center prong will bite into the counter top, followed by the side prongs which serve as depth gauges to limit further or excessive biting in of the center prong.

In forming the retaining clips 122, suitable spring steel strip may be used, with the clips derived as successive lengths from the strip as indicated in FIG. 18. As the prongs 143 are formed by cutting the end of the clip section from the strip, corresponding notches 144 are formed in the remaining end of the strip which becomes the distal end of the stabilizer leg 141 of the clip.

In severing the clip sections, a jagged severance line across the strip provides the alternate prongs and notches. As the strips are thus severed, the pronged end is bent up to form the prong terminal 140, and the opposite end portion of the strip is bent into overlying relation to the remainder of the clip on the same side as the terminal 140 to provide the stabilizer leg 141 with the center notch 144 in position to engage a screw shank. The center notch 144 conveniently straddles the screw shank as best seen in FIG. 16 to assist in the stabilizing action of the clip leg 141.

As the clip 122 is drawn up tight toward the counter top 111, cantilever force of the engagement leg 138 through the pronged terminal flange 140 tends to cant the leg 138 and tilt the opposite end up, but by the thrusting engagement of the stabilizer leg 141 against the screw shank, such tilting is precluded. As a result, the retaining leg 138 effects a strong clamping engagement against the underside of the counter top and the screw 123 through its head 130 draws the bracket 121 and thereby the lip of the rim flange 115 firmly down against the upper surface of the counter top. As the clamping action of the clip leg 138 reaches its maximum value or force, the resistance afforded causes the self-locking nut flanges 139 to draw up tight against the screw shank and thus retain the assembly against unintentional loosening such as may be effected by vibrations in and on the counter top and sink assembly.

In FIGURE 19 is shown a modification wherein a bracket 121' is utilized which comprises a short section which in other respects is the same as the bracket 121 already described, but affords an individual section having one of the hanger recesses 128' therein. In other respects, the assembly of FIGURE 19 is identical with the retaining structure 113 described and it will be understood that in structure and function the several parts identified by primed reference numerals are the same and may be used alternatively with the strip form 121 of the bracket structure if desired.

It will be understood, of course, that along each side of the sink 110 as many of the retaining clips 122 will be used as deemed desirable. Two or three of the clips may be sufficient along the short sides of the sink while four or more of the clips may be needed along the longer sides of the sink.

In the modification of FIGURES 20-24 a sink 210 has generally upright side walls 211 merging at their upper ends with a depressed or indented generally downwardly and inwardly sloping rib formation defining a drain-back groove 212 from the upper side of which extends generally outwardly and downwardly a resilient rim flange 213. At the rear of the sink, the drain-back groove is of substantially greater width to provide a ledge 212a through which openings 214 accommodate the usual plumbing fixtures. A counter top 215 is provided with a sink aperture opening 217 through which the sink bowl portion depends, there being sufficient clearance with respect to the edge of the counter top defining the opening 217 to accommodate retaining means 218 comprising a suitable number of retaining clips 219 connected by means of connecting and draw-up screws 220 to bracket structure 221 attached to the underside of the rim flange structure.

In an advantageous arrangement, the retaining brackets 221 are secured to the comparatively rigid and difficultly distortable indented, generally downwardly directed rib that defines the drain-back groove 212. In the form of the invention shown in FIGURES 20-24, the brackets 221 are in strip or bar form extending longitudinally throughout substantial lengths of the rim flange structure and more particularly the groove rib 212 and may extend throughout the entire straight length of each of the groove ribs along the four sides of the sink 210. In this instance, the bracket 221 in each instance comprises a base or body flange portion 222 which is generally conformed in cross-section to the underside of the drain-back groove rib so as to nest therewith and is secured thereto as by means of welding, brazing or the like. Along the inner side of the body web flange portion 222 a depending marginal flange 223 extends a limited distance downwardly and has an upwardly and outwardly angled terminal flange 224 defining with the flange 223 an upwardly opening groove. Along the outer side of the body web flange portion 222 is a depending flange 225 generally counterpart of the inner depending flange 223 but wider in order to have the lower edge of the margin substantially in a horizontal plane with the lower edge of the flange 223, and provided with a generally upwardly and inwardly angled oblique terminal flange portion 227 defining an upwardly opening groove with the inner face of the flange 225. Thereby, the flange terminals 224 and 227 in a sense provide a pair of spaced rails with a longitudinal gap between the rails.

Supported longitudinally adjustably along the rails defined by the flange terminals 224 and 227 is a screw retainer or saddle member 228 for each of the screws 220. In a desirable form the saddle members 228 comprise elongated plates in each instance provided with a central aperture 229 through which the shanks of the respective screws depend and upon which respective heads 230 of the screws are supported. At the opposite longitudinal sides of the retainer saddle plate in each instance are provided depending marginal flanges 231 which are arched from end-to-end on their lower edges and provide substantially spur-like and legs 232 which are of a length to engage within the rail grooves defined by respectively the terminal flanges 224 and 227 of the supporting bracket rail in each instance.

Initially, the screw 220 is assembled with the associated screw retainer 228 and the retainer is then assembled with the associated bracket rail 221 by an axial assembly movement from one end of the bracket rail to the position desired. In FIGURE 20, it will be observed that along the front and rear margins of the sink four of the clips are shown while at the sides three of the clips are shown generally equidistantly spaced, but it will be appreciated that as many or as few of the clips as desired may be used and disposed where most convenient or as required.

Each of the screws 220 is of a length to project downwardly from the supporting plate retainer 228 substantially below the lower face of the counter top 215 so that the respective clips 219 can be run up the threaded shanks of the screws into retaining engagement with the underside of the counter top.

Each of the clips 219 is made from suitable stiffly resilient material such as steel strip preferably hardened after formation of the clips to afford substantially spring steel characteristics. A substantially horizontal clip leg 233 is suitably apertured and provided with struck out thread engaging lock nut flanges 234 threadedly engaged with the threaded shank of the screw 220. One end portion of the clip leg 233 is turned up to provide a counter top underside gripping terminal flange 235 preferably provided at each side with an upwardly projecting tooth 237 with the intermediate portion of the edge recessed a limited distance and serving as a depth gauge, penetration limiting stop against the engaged underside of the counter top. The length of the clip leg 233 is such between the nut portions 234 and the terminal flange 235 as to project outwardly sufficiently into underlying relation to the sink rim flange 213 to engage the underside of the counter top 215 at an advantageous position beyond the edge of the sink aperture 217 so that when the clip 219 is run up the screw 220 and the terminal flange 235 drawn tightly against the underside of the counter top 215, the rim flange 213 will be drawn tightly downwardly against the top of the counter top by a clamping action through the several components of the attaching means 218. The draw-up action is facilitated by providing the lower end of the screw 220 with suitable tool engageable means such as a screwdriver slot 238.

Since there is a tendency for the clip clamping leg 233 to cant as it is drawn up, the inner end portion of the clip is provided with a generally upwardly and outwardly directed stabilizer leg 239 joined to the inner end of the clamping leg 233 by a reinforcing bend juncture 240. At its tip the stabilizer leg 239 engages the threaded shank of the screw 220 and thrusts thereagainst to hold the clip in stable position as the clip leg 233 is drawn up against the underside of the counter top. Furthermore, the juncture bend 240 serves as a shoulder which is engageable against the outer surface of the sink bowl wall 211 along the front and sides of the sink to retain the clip against turning relative to the sink, that is non-rotatable relative to the screw 220 as the clip is being drawn up. Under the rear ledge portion 212a of the rim flange, the prongs 237 are relied upon to retain the clip against turning. Of course, until the clip has in such instance been drawn up far enough to effect biting of the prongs 237 into the underside of the counter top 215, the clip will have to be held against turning out of the functional position thereof.

If preferred, of course, the clips and retaining screws may be assembled with the bracket rails 221 before the sink is assembled with the counter top 215. In such case, the clips 219 are only partially run up the screw 220 in each instance as shown in FIGURE 24 and the clamping legs 233 are disposed longitudinally alongside the adjacent sink bowl wall 211. After assembly has been effected of the sink with the counter top the respective clips are turned into their clamping relationship to the counter top and drawn up tight. On the other hand, through the present arrangement, the sink may be assembled with the counter top before the screws and clips are assembled with the bracket rails and then the screw retainer plates 228 carrying the respective screws 220 and with the retaining clips 219 partially run up on the screws are adapted to be inserted from the ends of the bracket rails 221 and appropriately positioned before tightening the clips against the underside of the counter top 215.

Upon completion of the tightening of each of the clips 219, the spur legs 232 of the retainer plates 228 effect biting engagement within the rail grooves defined by the flanges 224 and 227 of the bracket rails and thus positively hold against longitudinal displacement relative to the rails. At the same time, the clip terminal flange prongs 237 by their biting engagement with the underside of the counter top 215 positively hold the clips against being vibrationally or otherwise turned out of position. Further assurance against looseness or turning of the clips out of position or loosening of the screws 220 is afforded by the gripping locking action of the lock nut flanges 234 incident to tightening of the clips. Since the clamping drawing force of the clips and screws is distributed over a substantial area by virtue of the reinforcement afforded by the relatively stiff retaining bracket rails 221, distortion of the rim flange is substantially avoided even though the clips are drawn up quite tightly. It may also be pointed out that since the side flange legs 232 of the clip retaining bracket plates 228 are engaged within grooves defined by the bracket rail flanges 224 and 227, any tendency to draw away from the rail flanges is precluded either by spreading of the rail flange legs 227 and 225 or otherwise.

In the modification of FIGURES 25 and 26, an arrangement is shown that is in most respects similar to the construction of FIGURES 20–24, but provides individual brackets for the retaining screws instead of rail type brackets. In this instance, there is provided a sink 245 which may be a drawn sheet metal such as stainless steel sink having a bowl structure providing a vertical wall 247 having an indented rib drain-back groove structure 248 and a rim flange 249 projecting laterally outwardly for overlying a counter top 250, the sink bowl being received within a suitable aperture 251 in the counter top with a substantial space between the edge defining the aperture and the adjacent upper portion of the sink bowl wall 247 within which retaining means 252 are accommodated.

Herein the retaining means 252 comprises a screw 253 carrying a retaining clip 254 and suspended below the rim flange by an individual bracket 255. Similarly as in the previously described form, the bracket 255 is secured to the underside of the substantially rigid rib defining the drainback groove 248 and for this purpose comprises a generally U-shaped saddle portion 257 provided with laterally extending attachment flanges 258 which are formed to the transverse contour of the drain-back groove rib and are attached thereto as by means of welding, brazing or the like. A head 259 on the upper end of the screw 253 is supported within the saddle portion 257 and the shank of the screw depends through a suitable aperture therein, with the lower portion of the screw shank projecting substantially below the lower face of the counter top 250.

Each of the clips 254 has a clamping leg 260 which extends generally horizontally and has a struck-out lock nut flange structure 261 engaged with the threads of the screw 253. A turned up pronged terminal retaining flange 262 on the outer end of the leg 260 is engaged with the underside of the counter top. At its opposite end the clip has a return-bent generally upwardly and outwardly sloping stabilizer leg 263 with a reinforcing juncture bend 264 serving as a turn preventing shoulder against the opposing sink bowl wall 247. It will be appreciated that application and functioning of the retaining means 252 is similar to the retaining means 218 already described. In this instance, however, the location of the retaining means 252 will be predetermined by the attachment of the brackets 255 to the underside of the rim flange. In view of the fact that the drain-back groove rib is quite stiff, draw-down force imposed thereon by the respective brackets 255 will have little if any warping effect, especially since the flanges 258 of the brackets extend over a substantial length of the drain-back groove rib.

It will be understood that modifications and variations may be effected without departing from the scope of the novel concepts of the present invention.

I claim as my invention:

1. In a sink structure including a sink member having a bowl normally opening upwardly with a vertical wall structure and a rim flange at the normally top of the bowl and joined to the bowl wall by an upstanding but downwardly hollow reinforcing rib, bracket means secured directly onto the rim flange within the hollow rib spaced from the free margin of the rim flange for supporting sink attaching means exerting a strong downward pull upon the bracket means incident to the attachment, said rib being of substantial rigidity and thereby resisting distortion from said downward pull.

2. In a sink construction, a normally upwardly opening sink bowl member having a lateral rim flange joined to the sink bowl body by a reinforcing rib structure extending outwardly therefrom, a sink top having an aperture therein within which the bowl portion of the sink is received and providing a margin about the aperture upon which the extremity of the rim flange is engaged, and means attached to said rib structure for clampingly securing the rim flange to said top margin supported in tensioned relation by attachment to structure and engaged under compression with the underside of said top margin, said rib structure reinforcing the rim flange against distortion from the attachment tension effected by said securing means.

3. In a sink construction, a normally upwardly opening sink bowl member having a lateral rim flange joined to the sink bowl body by a reinforcing rib structure and sloping downwardly and outwardly therefrom, a sink top having an aperture therein within which the bowl portion of the sink is received and providing a margin about the aperture upon which the extremity of the rim flange is engaged, and means for clampingly securing the rim flange to said top margin supported in tensioned relation by attachment to said rib structure and engaged under compression with the underside of said top margin, said rib structure reinforcing the rim flange against distortion from the attachment tension effected by said securing means, said securing means comprising bracket structure secured to said rib structure and a screw depending from said bracket structure and engaging a clamping clip secured against the underside of the top margin.

4. In a sink structure including a normally upwardly opening sink bowl and a lateral rim flange projecting from the top of the bowl and adapted to overlie in assembled relation a drainboard or deck, means for securing the rim flange and deck or drainboard in the assembled relation including a clamping clip member adapted to engage under the deck or drainboard, means connected to the sink rim and to the clip for drawing the clip into said engagement, means for retaining the clip against canting when drawn up by said connected means, and means on the clip and on said bowl coactive for holding the clip against turning relative to the sink out of the deck or drainboard engaging relation.

5. In a sink structure including a formed sheet metal sink bowl normally upwardly opening and having a lateral rim flange adapted for engagement upon a sink top member or the like, bracket means carried on the underside of said flange adjacent the sink bowl, depending screw means carried by said bracket means and including an elongated shank spaced a predetermined distance from the adjacent portion of the sink bowl and a retaining clip carried by the screw means and having a leg projecting away from the sink bowl and engageable under a sink top upon which the rim flange is engaged and adapted to move up relative to said bracket to be placed under clamping pressure against the underside of the sink top by action of said screw means, said clip having means spaced from said leg and engageable with the screw shank and movable therealong coincidentally with said leg clamping movement and relative to said bracket means for retaining the clip leg against canting relative to the screw means incident to said moving up and drawing of the leg against the underside of the sink top by the screw means.

6. In a sink structure including a sheet metal sink bowl normally opening upwardly and having a lateral rim flange engageable upon a sink top member with the sink bowl received through an aperture in the sink top member, a bracket attached under the rim flange, a screw having a head portion freely rotatably supported by the bracket and provided with a lower end portion with manipulating tool receiving means thereon, a retaining clip having a generally horizontal leg with thread-following nut-like means engageable with the screw threads for running the clip up the screw by turning the screw for engagement of an end portion of the clip leg under the sink top member for compression gripping thereof and clamping of the rim flange thereagainst, and a return-bent leg extending from the opposite end of said first mentioned clip leg and having an end portion runably engageable with the screw thread together and coincidentally with said first leg and relative to the bracket and bracingly thrusting against the screw to hold the first mentioned clip leg against canting as it is placed under compression against the sink top member by rotary action of the screw.

7. In a sink structure including a sheet metal sink bowl normally opening upwardly and having a lateral rim flange engageable upon a sink top member with the sink bowl received through an aperture in the sink top member, a bracket attached under the rim flange, a screw having a head portion freely rotatably supported by the bracket and provided with a lower end portion with manipulating tool receiving means thereon, a retaining clip having a generally horizontal leg with thread-following nut-like means engageable with the screw threads for running the clip up the screw by turning the screw for engagement of an end portion of the clip leg under the sink top member for compression gripping thereof and clamping of the rim flange thereagainst, and a return-bent leg extending from the opposite end of said first mentioned clip leg and having an end portion runably engageable with the screw thread and bracingly engageable with the screw to hold the first mentioned clip leg against canting as it is placed under compression against the sink top member by rotary action of the srcew, said return-bent leg having a turn-preventing shoulder slidably engageable with a fixed opposing shoulder means of the sink structure to prevent turning of the clip as it is run up on the screw.

8. In a sink structure including a sheet metal sink bowl normally opening upwardly and having a lateral rim flange engageable upon a sink top member with the sink bowl received through an aperture in the sink top member, a bracket attached under the rim flange, a screw having a head portion freely rotatably supported by the bracket and provided with a lower end portion with manipulating tool receiving means thereon, a retaining clip having a generally horizontal leg with thread-following nut-like means engageable with the screw threads for running the clip up the screw by turning the screw for engagement of an end portion of the clip leg under the sink top member for compression gripping thereof and clamping of the rim flange thereagainst, and a return-bent leg extending from the opposite end of said first mentioned clip leg and having an end portion runably engageable with the screw thread and bracingly engageable with the screw to hold the first mentioned clip leg against canting as it is placed under compression against the sink top member by rotary action of the screw, said return-bent leg having a turn-preventing shoulder slidably engageable with a fixed opposing shoulder means of the sink structure to prevent turning of the clip as it is run up on the screw, said shoulder comprising an extension from the screw engaging end portion of the return-bent leg.

9. In a sink structure including a sheet metal sink bowl normally opening upwardly and having a lateral rim flange engageable upon a sink top member with the sink bowl received through an aperture in the sink top member, a bracket attached under the rim flange, a screw having a head portion freely rotatably supported by the bracket and provided with a lower end portion with manipulating tool receiving means thereon, a retaining clip having a generally horizontal leg with thread-following nut-like means engageable with the screw threads for running the clip up the screw by turning the screw for engagement of an end portion of the clip leg under the sink top member for compression gripping thereof and clamping of the rim flange thereagainst, and a return-bent leg extending from the opposite end of said first mentioned clip leg and having an end portion runably engageable with the screw thread and bracingly engageable with the screw to hold the first mentioned clip leg against canting as it is placed under compression against the sink top member by rotary action of the screw, said return-bent leg having a turn-preventing shoulder slidably engageable with a fixed opposing shoulder means of the sink structure to prevent turning of the clip as it is run up on the screw, said shoulder comprising a portion adjacent juncture of the return-bent leg with the first mentioned leg of the clip.

10. In a sink structure, a retaining clip having return-bent divergently extending legs connected by a substantially rigid juncture rib structure, one of said clip legs being longer than the other and having an opening therethrough spaced substantially from its free end for passage of an attachment screw, while said other leg has an end portion substantially spaced from the apertured portion of the one leg but provided with screw engagement means for thrusting against the screw and running therealong coincident with movement of said one leg and thereby stabilizing the one leg against canting when its free end portion is drawn against a member under cantilever compression, and turn-preventing shoulder means on the clip adapted for slidable engagement with a fixed opposing shoulder means of a sink assembly with which the clip may be associated to prevent turning of the clip as it is run along a fastening screw extending through said screw aperture and in engagement with said engagement means of the remaining leg.

11. In a sink structure including a formed sheet metal sink bowl normally opening upwardly and having a lateral rim flange adapted for engagement upon a sink top member or the like, bracket structure carried on the underside of said flange spaced from the free margin of the flange and adjacent to the sink bowl, depending screw means carried by said bracket structure and including an elongated shank spaced a predetermined distance from the adjacent portion of the sink bowl, and a retaining clip carried by the screw means elongated shank and having a first leg projecting away from the sink bowl and engageable under a sink top upon which the rim flange is engaged and the shank and said first leg having coacting means operative to move the first leg along the shank and up relative to said bracket to be placed under clamping pressure against the underside of the sink top by action of said screw means, the clip having a second leg disposed in the space between the elongated screw shank and the sink bowl and generally in return-bent relation to said first mentioned leg and engaging thrustingly with the screw shank and movable therealong together and coincidental with said first leg and relative to said bracket structure during said up movement of said first leg to hold the first leg substantially against canting as it is moved up and drawn by the screw means into compression engagement with the underside of the sink top.

12. In a sink structure including a sink bowl normally opening upwardly and having a vertical wall structure provided with a rim flange at the normally top of the bowl projecting laterally outwardly therefrom and joined to the vertical wall structure by a reinforcing rib structure, bracket means secured to the underside of the rim flange and providing a pair of confronting spaced apart longitudinally extending bracket rails affording a space thereabove and below said rim flange and extending substantially parallel to and adjacent to said rib, and means carried upon the tops of the bracket rails and projecting down therebetween and longitudinally adjustable along the bracket rails and including means for sink structure attaching engagement under a supporting top structure upon which said rim flange is seated in assembly of the sink structure with the top structure.

13. In a sink construction, a top structure providing an aperture receptive of a sink bowl, a normally upwardly opening stainless steel sheet formed sink bowl disposed in said aperture and having laterally outwardly projecting from the top of the bowl a self-rimming flange engaged upon said top structure about said aperture, there being a space between the edge of the top structure defining said aperture and the sink bowl with a portion of the flange overlying the space, said portion of the flange having secured thereto bracket means providing a pair of elongated rails confronting one another in limited gap relation and projecting down in said space substantially parallel to the adjacent edge defining said aperture, and sink retaining means carried by said rails and depending therefrom and engageable under the sink top adjacent to said edge, said retaining means being adjustable slidably along said rails into preferred retaining position.

14. In a sink construction including a sink bowl normally opening upwardly and having a vertical wall structure provided with a rim flange at the normally top of the bowl projecting laterally outwardly therefrom and joined to the vertical wall structure by reinforcing rib structure, bracket structure including an elongated bracket strip of angular cross-section and substantial rigidity secured fixedly to the underside of the rim flange and close to and substantially parallel with and to a substantial length along said reinforcing rib structure and affording substantial reinforcement against distortion of the rim flange, and sink retaining members carried by the bracket structure and projecting down therefrom and having means for sink-attaching engagement under a supporting top structure upon which said rim flange is seated in assembly of the sink structure with the top structure.

15. In a sink structure, an upwardly opening sheet metal sink bowl having on its upper margin a laterally outwardly extending rim flange joined to the bowl by an upstanding reinforcing rib and a downwardly projecting rib inwardly adjacent thereto and affording a drain back groove along the upper margin of the sink bowl below said rim flange, and means for securing the rim flange in place on a counter top, said securing means including a bracket having flanges thereof secured respectively to the inner side of the upstanding rib and the downwardly projecting side of the downwardly projecting rib and a clip and connecting member supported by said bracket.

16. In a sink construction including a sink having a bowl with a lateral rim flange and a counter top with an aperture therein into which said bowl is dependent and with the rim flange lying upon the counter top about said aperture, a plurality of retaining structures under said rim flange including bracket means secured to the underside of the rim flange and attachment screws depending from the bracket means and supporting retaining clips, each of the retaining clips having a generally horizontal leg coactive in draw-up relation with a screw and having at one end a central prong terminal bitingly engageable with the underside of the counter top when drawn thereagainst by the associated screw and at the opposite end a stabilizing leg with a central extremity notch therein engaging the screw shank above the horizontal leg within the notch to retain the horizontal leg against canting as drawn up, said prong being complementary in size to said notch.

17. In a sink structure, a retaining clip having an elongated horizontally disposable leg with means thereon for engagement by a draw up screw, said leg having a terminal thereon including a central prong and a prong at each side of said central prong shorter than the central prong and adapted to penetrate a counter top underside following penetration thereof by the central prong.

18. In a sink structure, a bracket for attachment to a sink rim flange construction of generally Z-shape contour, the bracket being of generally Z-shape cross-section and having an upper flange and a lower flange, said flanges projecting in opposite directions and having a connecting body flange therebetween, said upper flange and said body flange having debossed therein a retaining hanger recess with the bottom of the recess generally aligned with said lower flange, said bottom of the recess having an aperture therein for receiving connecting means for a retaining clip.

19. In a sink structure including a drawn sheet metal sink having a bowl and a self-rimming lateral flange joined to the bowl on an indented drain-back groove rib, a counter top having a portion engaged by said rim flange, and means for retaining the sink including a bracket secured to the underside of the drain-back groove rib and supporting a depending connecting member carrying a retaining clip drawn up against the underside of the counter top and thereby through said connecting member and said bracket drawing the rim flange tightly against the top of the counter top.

20. In a sink structure retaining means comprising a bracket to be attached to the underside of a self-rimming sink flange, a clip having a generally horizontal leg with an upturned terminal flange provided at its opposite corners with upstanding prongs for biting into the underside of a counter top and an edge surface recessed throughout the distance between said prongs providing a depth gauge stop for the prongs, and means for connecting the clip to the bracket.

21. In a sink construction, a sheet metal sink bowl having on its upper end a laterally outwardly projecting integral rim flange with an indented juncture rib connecting the sink bowl and flange and providing on its upper surface a drain-back groove depressed below the top of the flange and offsetting the same relative to the adjacent upper end of the bowl, the underside of said juncture rib presenting a surface of substantial width facing downwardly and outwardly, a bracket having flange means conformed to said underside surface of said juncture rib and attached permanently thereto and supported thereby spaced from both said flange and the sink bowl, said bracket having depending from said flange structure spaced apart flanges provided therebetween and spaced below said juncture rib with seating surface supporting structure disposed in substantially a horizontal plane, and sink securing means including an elongated screw member having on the upper end portion thereof suspension structure supported in a horizontal plane by said seating surface supporting structure with the screw depending vertically therebelow for manipulation of its lower end for securing the attaching means with respect to a counter top with which the sink may be assembled.

22. In a sink structure including a sink bowl having a lateral self-rimming rim flange joined to the sink bowl by a generally indented drain-back groove rib sloping upwardly and outwardly, a bracket having a portion generally conformed to the sloping shape of the underside of said rib and secured thereto and having depending supporting structure below the rib, and means carried by said supporting structure for retaining engagement with a counter top upon which said flange rests in assembly with a counter.

23. In a sink construction, a sink bowl comprising sheet metal and opening upwardly with a laterally outwardly projecting rim flange on the upper end of the bowl and of resilient flexibility for tensioned seating thereof on a counter top, said flange being connected to the sink bowl by reinforcing means comprising a plurality of ribs which provide the juncture between the flange and the sink bowl and include a generally upstanding rib contiguous the flange and a depressed rib contiguous the sink bowl and defining therewith a drain-back groove, an elongated bracket of generally Z-shape cross-section and having an upper flange secured in the underside of said upstanding rib with a downwardy extending body flange alongside the depressed rib and joined to a lower inwardly projecting flange secured to the underside of said depressed rib, said upper flange and said body flange having debossed therein a downwardly depressed retaining hanger portion, and manipulable securing structure carried by said debossed hanger portion and engageable under a counter top on which said flange is engaged for drawing said bracket downwardly and thereby drawing said flange downwardly against the counter top.

24. In a structure adapted to be mounted in an opening therefor extending through the plane of a horizontally disposed and generally planar counter; the combination comprising (a) a flange permanently secured to said structure and extending laterally outwardly therefrom for overlying engagement with such a counter along the marginal edges of the opening therein, (b) an elongated generally channel shaped element fixedly secured to the underside of said flange laterally inwardly of the outer edge thereof and extending therealong for dependency into such an opening, (c) and clamping device detachably carried by said generally channel shaped element and disposed entirely below the plane of said flange to depend into such an opening; said clamping structure including (1) a first part engaging said generally channel shaped element and being slidable therealong for selective positioning of said clamping device along the length of said mounting element in such an opening, (2) a second part arranged to bear against the underside of such a counter, (3) a third part having an opening therein provided with screw-thread-engaging means, (4) and a member arranged in threaded engagement with said screw-thread-engaging means in said opening in said third part for producing a force between said first and second parts so as to draw said flange downwardly into firm engagement with the upper surface of such a counter.

References Cited in the file of this patent

UNITED STATES PATENTS

| | | |
|---|---|---|
| 696,422 | Duffy | Apr. 1, 1902 |
| 826,591 | Mohr | July 24, 1906 |
| 1,489,474 | Beckwith | Apr. 8, 1924 |
| 2,172,248 | Kost | Sept. 5, 1939 |
| 2,582,463 | Skinner | Jan. 15, 1952 |
| 2,584,581 | Harris | Feb. 5, 1952 |
| 2,672,621 | Drain | Mar. 23, 1954 |
| 2,767,609 | Cousino | Oct. 23, 1956 |
| 2,818,580 | Galley | Jan. 7, 1958 |

OTHER REFERENCES

Domestic Engineering, pages 34 and 35, August 1957.